US 6,580,588 B1

(12) United States Patent
Gill

(10) Patent No.: US 6,580,588 B1
(45) Date of Patent: Jun. 17, 2003

(54) RESETTABLE DUAL AP PINNED VALVE SENSOR INSENSITIVE TO SENSE CURRENT DIRECTION AND HAVING SYMMETRICALLY BALANCED FIELDS ABOUT A FREE LAYER

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 09/684,252

(22) Filed: Oct. 6, 2000

(65) Prior Publication Data

(65)

(51) Int. Cl.[7] .................................................. G11B 5/39
(52) U.S. Cl. ................................ 360/324.1; 360/324.11
(58) Field of Search ...................... 360/324.1, 324.11, 360/324.12

(56) References Cited

U.S. PATENT DOCUMENTS

| | | | | |
|---|---|---|---|---|
| 5,287,238 A | | 2/1994 | Baumgart et al. | 360/113 |
| 5,748,399 A | | 5/1998 | Gill | 360/66 |
| 6,175,476 B1 | * | 1/2001 | Huai et al. | 360/324.11 |
| 6,191,926 B1 | * | 2/2001 | Everitt et al. | 360/324.11 |
| 6,252,750 B1 | * | 6/2001 | Gill | 360/324.11 |
| 6,295,187 B1 | * | 9/2001 | Pinarbasi | 360/324.11 |
| 6,313,973 B1 | * | 11/2001 | Fuke et al. | 360/324.1 |
| 6,381,105 B1 | * | 4/2002 | Huai et al. | 360/314 |
| 6,424,506 B1 | * | 7/2002 | Saito et al. | 360/324.11 |

* cited by examiner

Primary Examiner—Jefferson Evans
(74) Attorney, Agent, or Firm—Ervin F. Johnston

(57) ABSTRACT

A dual spin valve sensor is provided which includes a ferromagnetic free layer, first and second antiparallel (AP) pinned layer structures, a nonmagnetic conductive first spacer layer between the free layer and the first AP pinned layer structure, a nonmagnetic conductive second spacer layer between the free layer and the second AP pinned layer structure, an antiferromagnetic first pinning layer exchange coupled to the first AP pinned layer structure for pinning a magnetic moment of the first AP pinned layer structure in a first direction and an antiferromagnetic second pinning layer exchange coupled to the second AP pinned layer for pinning a magnetic moment of the second AP pinned layer structure in a second direction. The first and second AP pinned layer structures have thicknesses which urge the magnetic moment of the first AP pinned layer structure in the first direction and urge the magnetic moment of the second AP pinned layer in the second direction when a current pulse is conducted through the spin valve sensor.

39 Claims, 8 Drawing Sheets

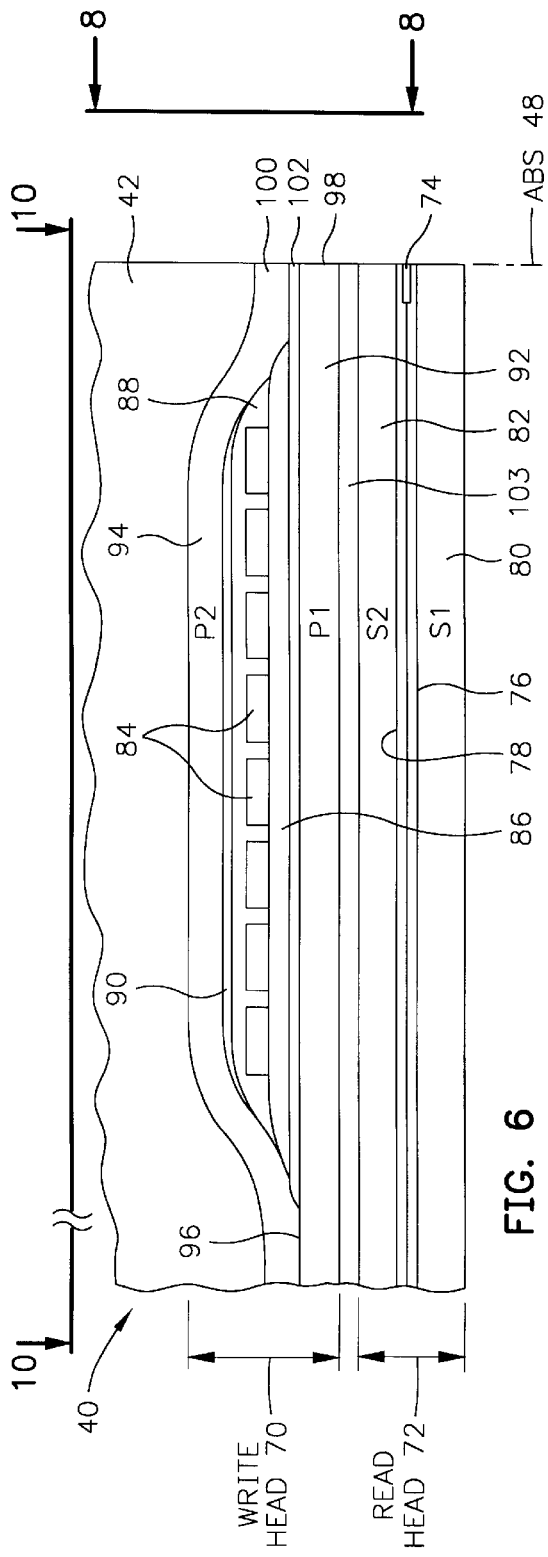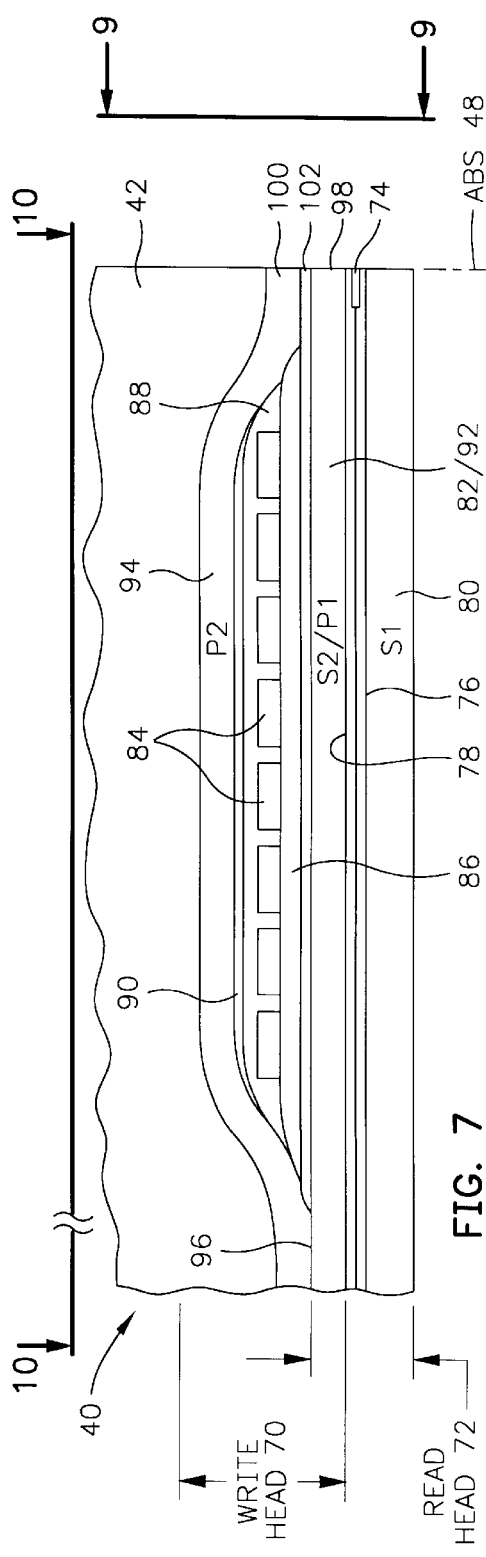

(ABS)

RESETTABLE DUAL AP PINNED VALVE SENSOR INSENSITIVE TO SENSE CURRENT DIRECTION AND HAVING SYMMETRICALLY BALANCED FIELDS ABOUT A FREE LAYER

BACKGROUND OF THE INVENTION

1. Field of the Invention

The present invention relates to a resettable dual antiparallel (AP) pinned spin valve sensor insensitive to a sense current direction and having symmetrically balanced fields about a free layer and, more particularly, to such a spin valve sensor wherein the magnetic spins of first and second pinning layers of the spin valve sensor can be reset by a current pulse through a sense current circuit.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor are a function of cos θ, where θ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers. The strongest magnetic force on the free layer structure is the sense current field $H_I$. In an exemplary bottom spin valve sensor where the free layer is closer to the second gap layer than it is to the first gap layer the majority of the conductive layers are below the free layer structure between the free layer structure and the first gap layer. The amount of conductive material in this region is further increased if the pinning layer is metal, such as platinum manganese (PtMn), instead of an oxide, such as nickel oxide (NiO). When the sense current is conducted through the sensor the conductive layers below the free layer structure cause a sense current field on the free layer structure which is minimally counterbalanced by a typical cap layer made of tantalum (Ta) on top of the free layer structure. Further, the pinned layer structure below the free layer structure in a bottom spin valve sensor exerts a demagnetizing field on the free layer structure which needs to be counterbalanced to improve asymmetry of the spin valve sensor. There is a strong-felt need to counterbalance the sense current and demagnetizing fields and optimize the sense current and the type of material of the pinning layer while still obtaining the desired readback symmetry of the spin valve sensor.

A dual spin valve sensor may be employed for increasing the magnetoresistive coefficient dr/R of a read head. In a dual spin valve sensor first and second pinned layers are employed with a first spacer layer between the first pinned layer and the free layer and a second spacer layer located between the second pinned and the free layer. With this arrangement the spin valve effect is additive on each side of the free layer to increase the magnetoresistive coefficient dr/R of the read head. In order to reduce demagnetizing fields from the first and second pinned layers on the free layer, each pinned layer may be an antiparallel (AP) pinned layer structure. An AP pinned layer structure has an antiparallel coupling (APC) layer which is located between ferromagnetic first and second AP pinned layers. The first and second AP pinned layers have magnetic moments which are antiparallel with respect to one another because of the strong antiferromagnetic coupling therebetween. The AP pinned layer structure is fully described in commonly assigned U.S. Pat. No. 5,465,185 which is incorporated by reference herein. Because of the partial flux closure between the first and second AP pinned films of each of the first and second AP pinned structures, each AP pinned layer structure exerts only a small demagnetizing field on the free layer. These demagnetizing fields, however, are typically additive since the magnetic moments of the AP pinned layers immediately adjacent the free layer must be in-phase (parallel with respect to one another) in order for the spin valve effect to be additive. Further, the magnetic moments of the AP pinned layers immediately adjacent the free layer exert ferromagnetic coupling fields $H_{FC}$ on the free layer which are also typically additive and parallel to the demagnetizing fields $H_D$. Accordingly, a net demagnetizing field $H_D$, which is an addition of the net demagnetizing fields from the AP pinned layer structures and a net ferromagnetic coupling field $H_{FC}$, which is an addition of the ferromagnetic coupling fields, act on the free layer. The net demagnetizing field and the net ferromagnetic coupling field are additive to urge the magnetic moment of the free layer from its zero bias position parallel to the ABS. There is a strong-felt need to counterbalance these magnetic fields on the free layer so as to obtain proper biasing thereof.

SUMMARY OF THE INVENTION

The present invention provides a dual AP pinned spin valve sensor wherein the thicknesses of the layers of each of first and second AP pinned layer structures provide the aforementioned desired biasing of the free layer and permit the first magnetic spins of the first and second pinning layers to be reset by a current pulse through the sense current circuit. The first AP pinned layer structure has a first antiparallel coupling layer which is located between first and second AP pinned layers with the first AP pinned layer interfacing the first pinning layer and the second AP pinned layer structure has a second antiparallel coupling layer which is located between third and fourth AP pinned layers with the fourth AP pinned layer interfacing the second pinning layer. The desired reset is accomplished by providing the first and fourth AP pinned layers with equal magnetic thicknesses and the second and third AP pinned layers with equal magnetic thicknesses with the thicknesses of the second and third AP pinned layers being greater than or less than the magnetic thicknesses of the first and fourth AP pinned layers. With this arrangement the spin valve sensor is insensitive to the direction of the sense current. The invention further provides an equal amount of electrically conductive material above and below the free layer and negative and positive ferromagnetic coupling fields below and above the free layer respectively so that each of the demagnetizing fields, sense current fields and ferromagnetic coupling fields below and above the free layer completely counterbalance each other.

An object of the present invention is to provide a resettable dual AP pinned spin valve sensor which is insensitive to a sense current direction.

Another object is to provide the foregoing spin valve sensor with symmetrically balanced fields about a free layer.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
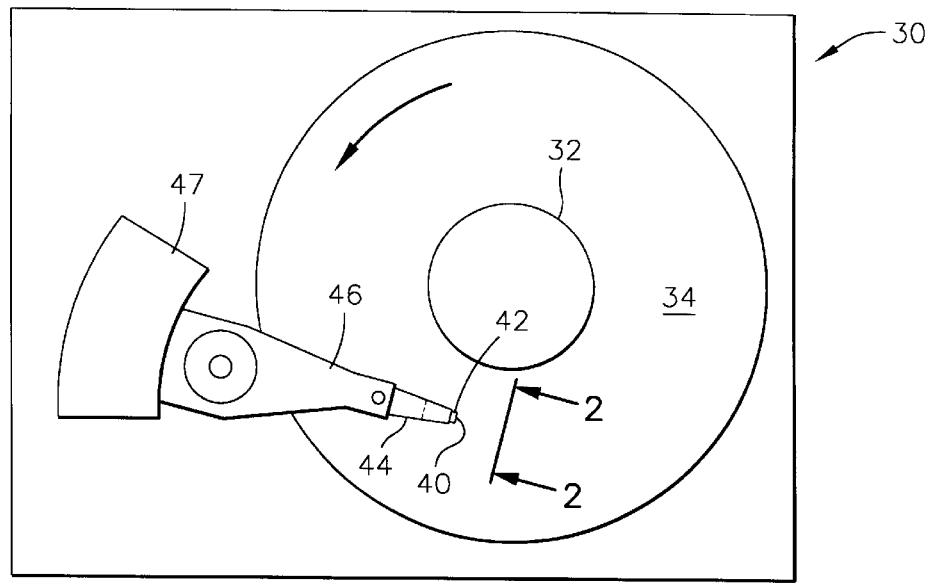
FIG. 1 is a plan view of an exemplary magnetic disk drive.
Figure 2:
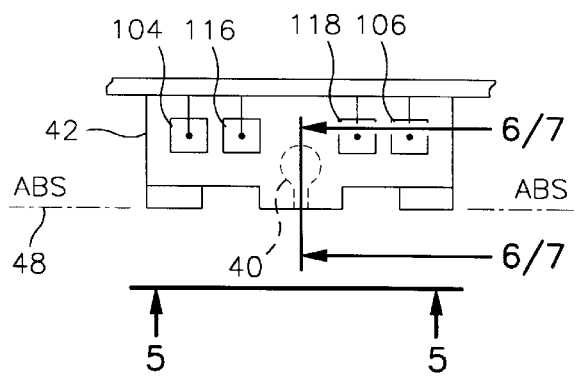
FIG. 2 is an end view of a slider with a magnetic head of the disk drive as seen in plane 2—2 of FIG. 1.
Figure 3:
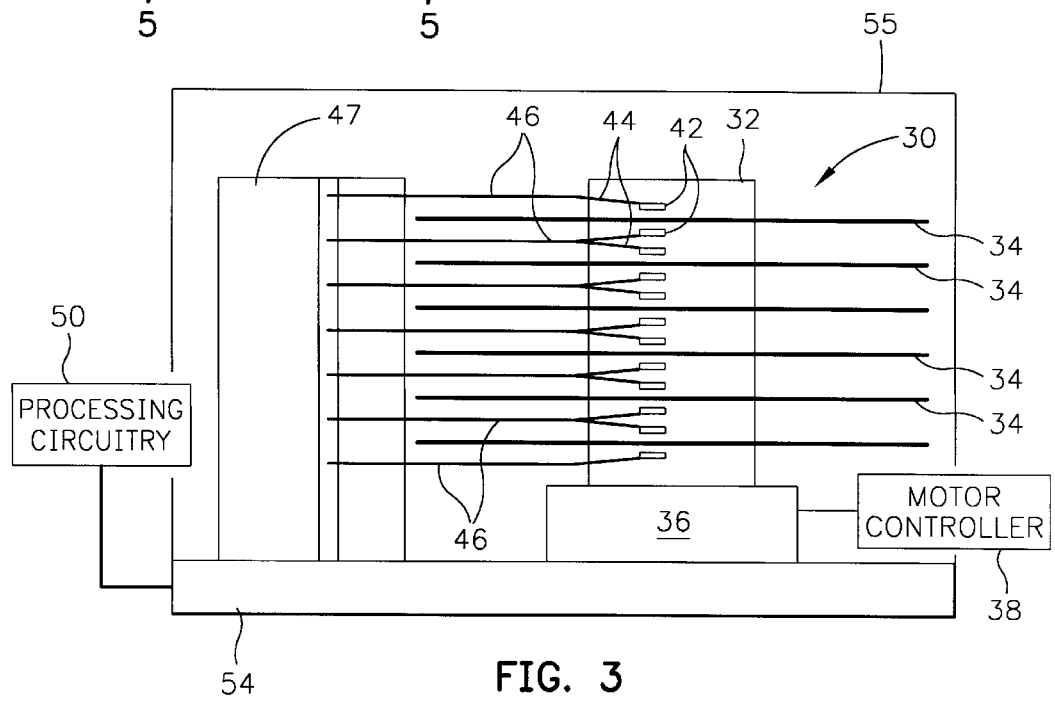
FIG. 3 is an elevation view of the magnetic disk drive wherein multiple disks and magnetic heads are employed.
Figure 4:
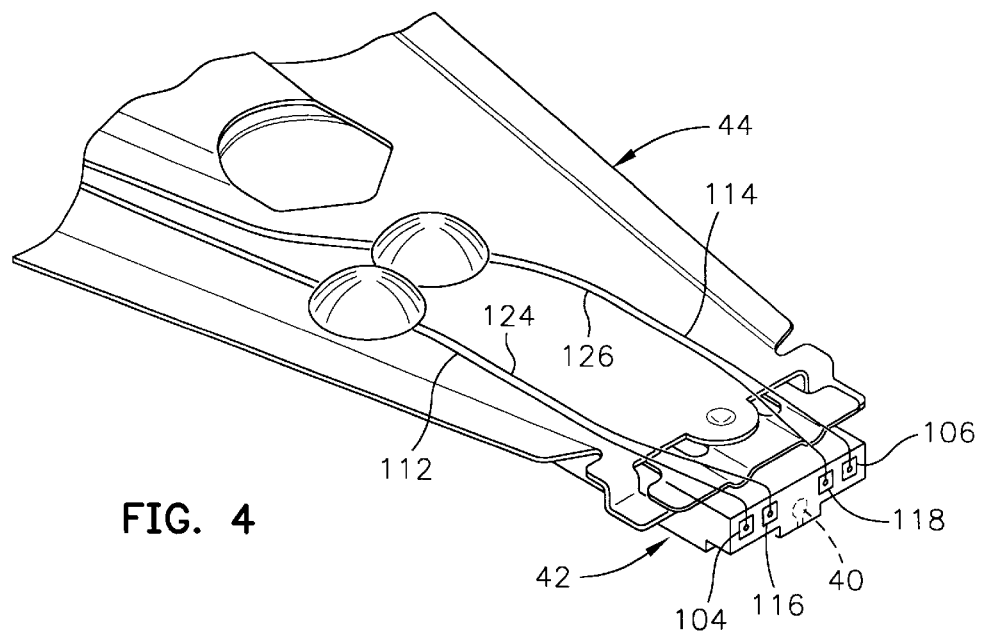
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
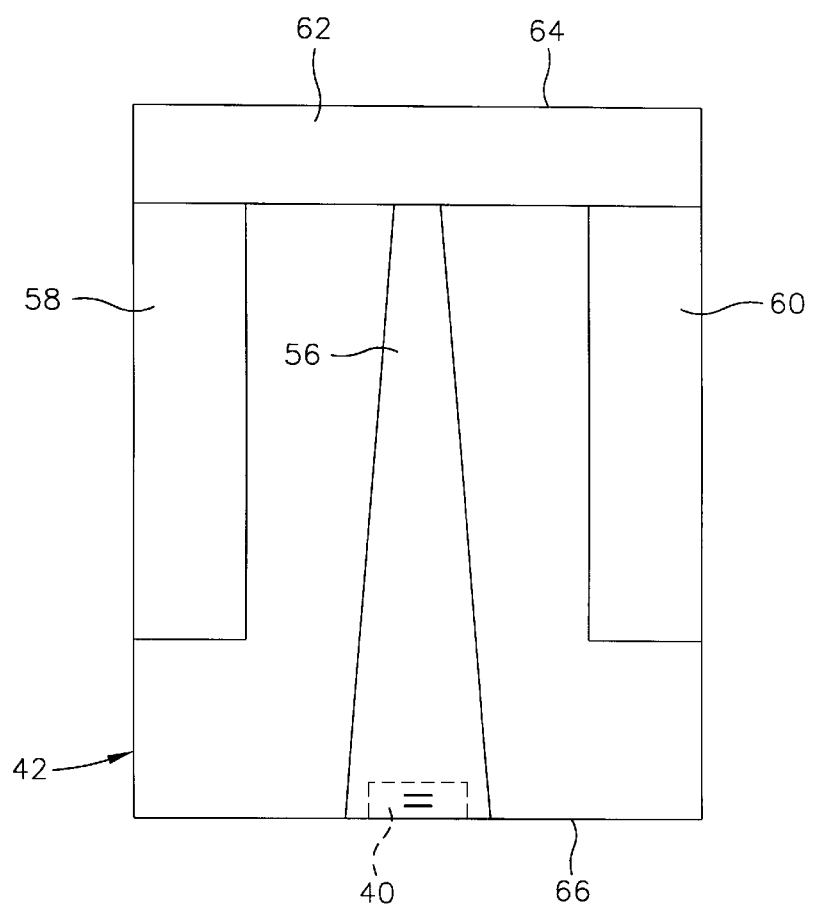
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
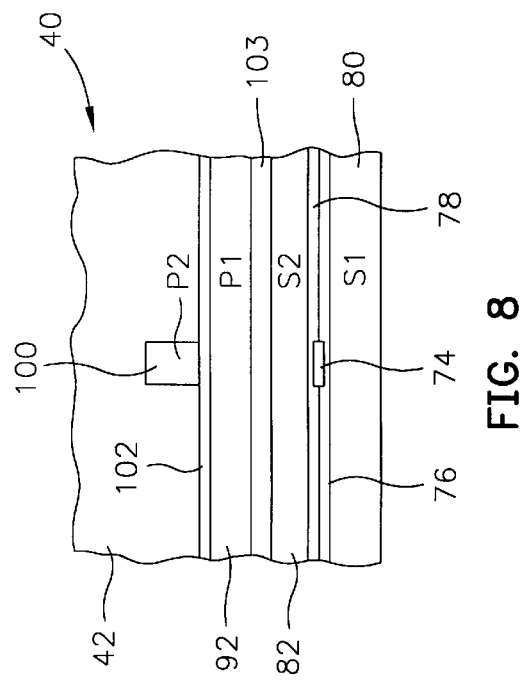
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
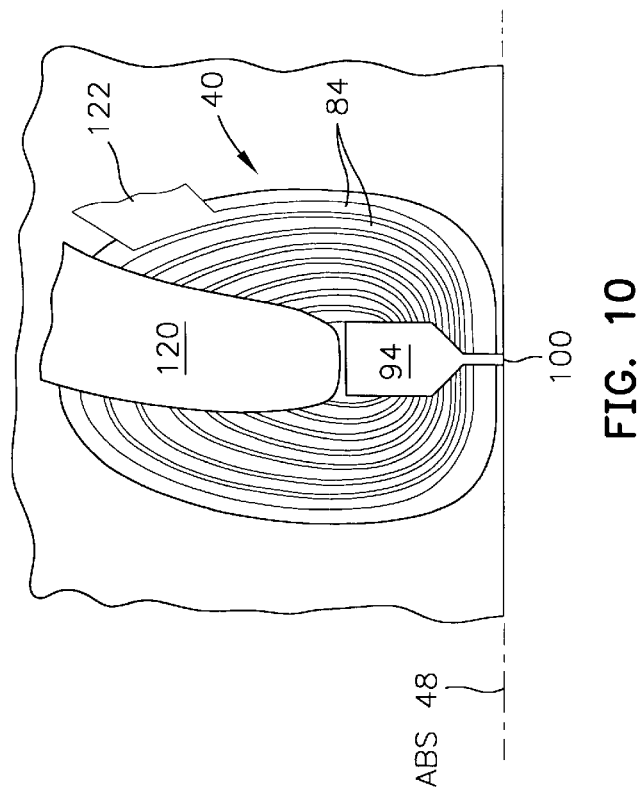
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
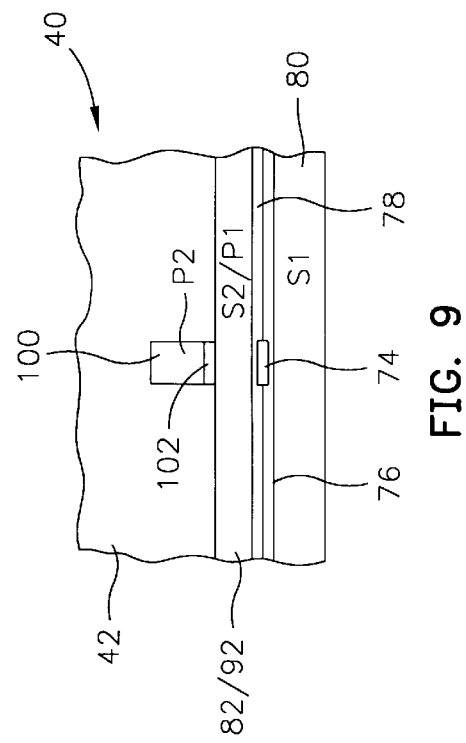
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
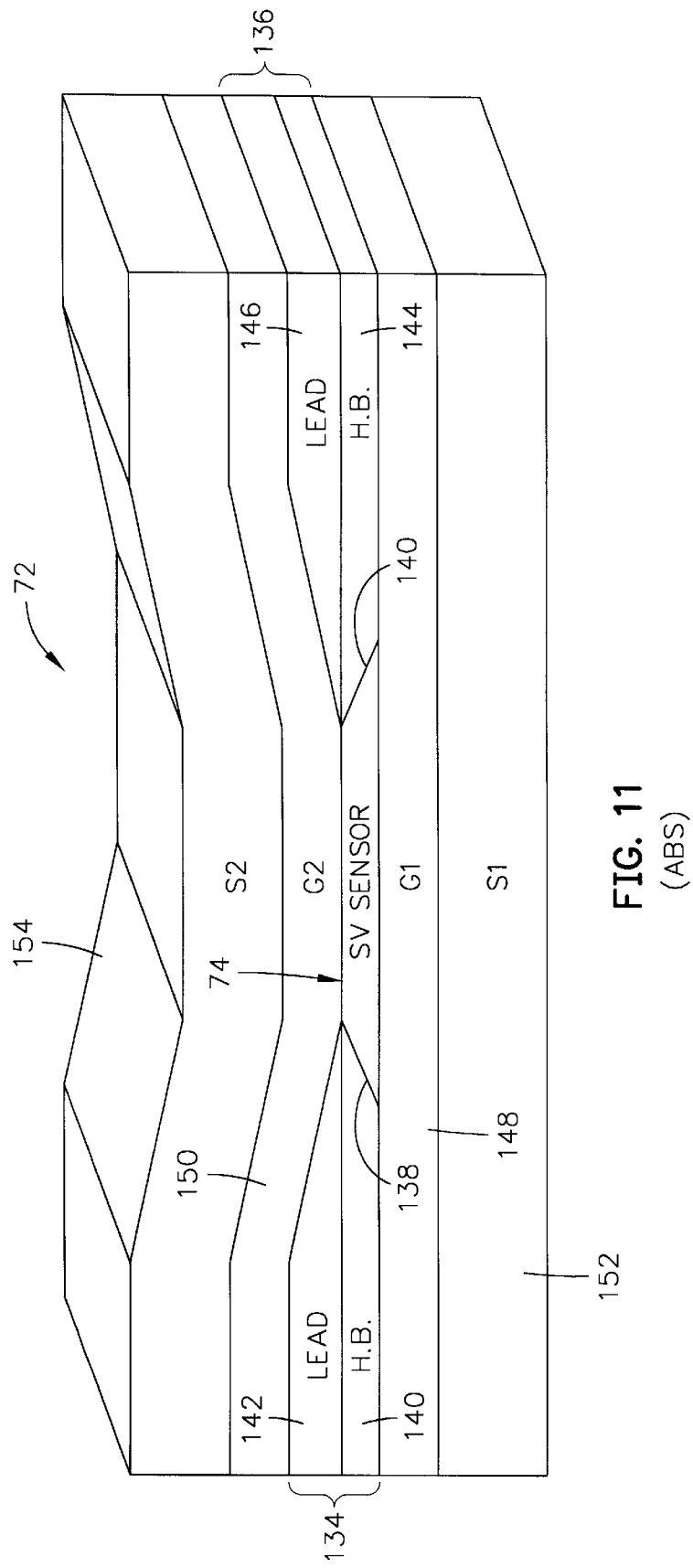
FIG. 11 is an enlarged isometric illustration of a read head which has the present dual spin valve sensor.

FIG. 11 is an isometric ABS illustration of the read head 72 shown in FIGS. 6 or 8. The read head 72 includes the present dual spin valve sensor 74. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
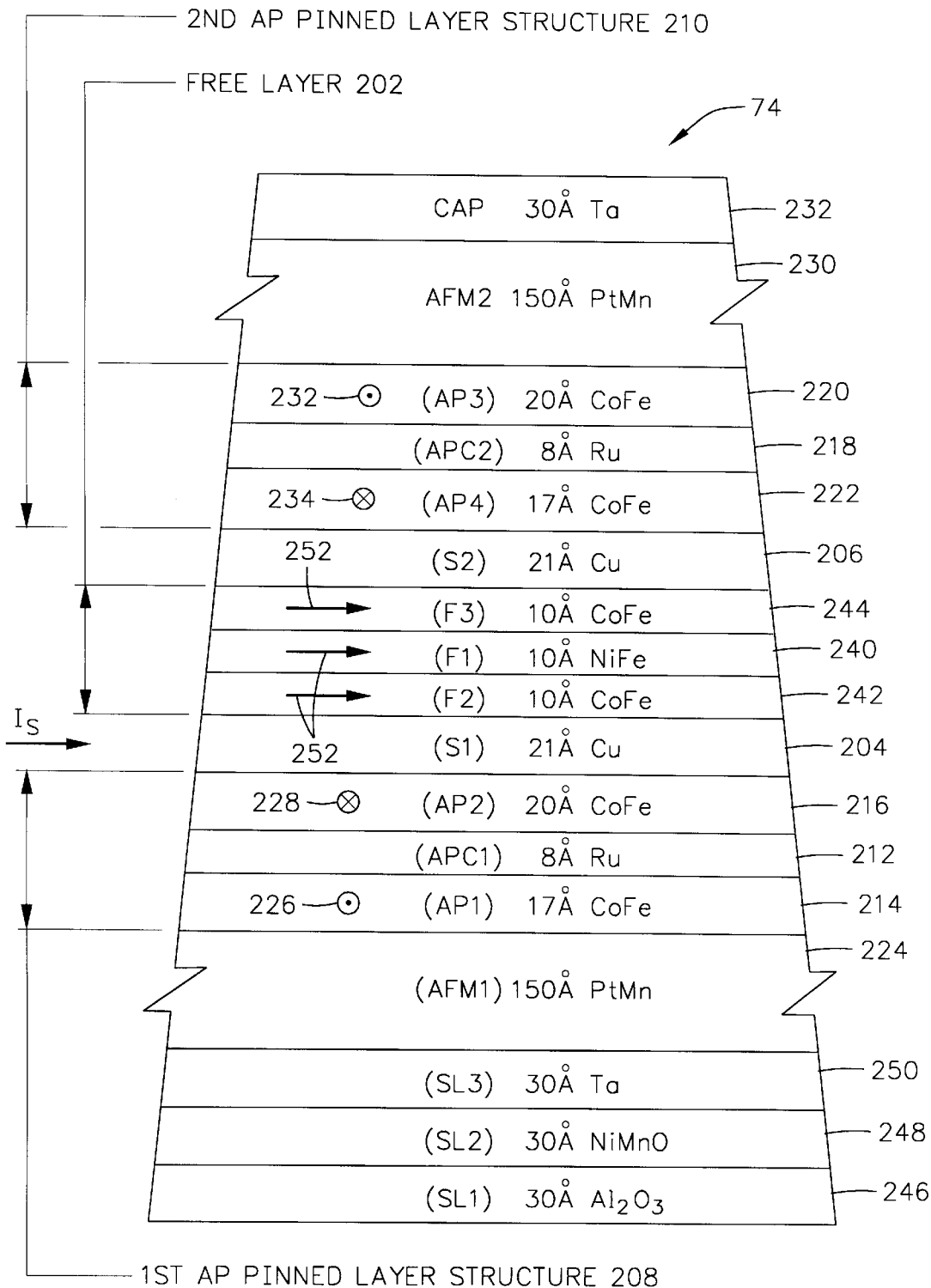
FIG. 12 is an ABS illustration of the present dual spin valve sensor.

FIG. 12 is an ABS illustration of the present dual AP pinned spin valve sensor 74. In this sensor a free layer 202 is located between nonmagnetic conductive first and second spacer layers (S1 and S2) 204 and 206. The first and second spacer layers 204 and 206 are, in turn, located between first and second AP pinned layer structures 208 and 210. The first AP pinned layer structure 208 includes an antiparallel coupling (APC) layer 212 which is located between ferromagnetic first and second AP pinned layers (AP1) and (AP2) 214 and 216. The second AP pinned layer structure 210 includes a second antiparallel coupling (APC) layer 218 which is located between ferromagnetic third and fourth AP layers (AP3) and (AP4) 220 and 222.

An antiferromagnetic first pinning layer (AFM1) 224 is exchange coupled to the first AP pinned layer 214 for pinning a magnetic moment 226 of the first AP pinned layer perpendicular to the ABS, such as out of the sensor as shown in FIG. 12. By strong antiparallel coupling between the AP pinned layers 214 and 216 the AP pinned layer 216 has a magnetic moment 228 which is antiparallel to the magnetic moment 226. A second antiferromagnetic pinning layer (AFM2) 230 is exchange coupled to the third AP pinned layer 220 for pinning a magnetic moment 232 of the third AP pinned layer perpendicular to the ABS and out of the sensor, as shown in FIG. 12. Again, by a strong antiparallel coupling field between the third and fourth AP pinned layers 220 and 222 the fourth AP pinned layer 222 has a magnetic moment 234 which is antiparallel to the magnetic moment 232. The free layer 202 may include first free film (F1) 240 of nickel iron (NiFe) which is located between second and third free films (F2) and (F3) 242 and 244 of cobalt iron (CoFe). It has been found that the cobalt iron (CoFe) free films next to the copper (Cu) spacer layers 204 and 206 increase the magnetoresistive coefficient dr/R of the sensor.

First, second and third seed layers (SL1, SL2 and SL3) 246, 248 and 250 are provided for the first pinning layer 224. Exemplary thicknesses and materials for the seed layers are 30 Å of aluminum oxide ($Al_2O_3$) for the first seed layer 246, 30 Å of nickel manganese oxide (NiMnO) for the second seed layer 248 and 30 Å of tantalum (Ta) for the third seed layer 250. The first seed layer may be located on an aluminum oxide ($Al_2O_3$) first read gap layer, as shown at 148 in FIG. 11, or optionally may be part thereof, the second seed layer 248 is located on the first seed layer and the third seed layer 250 is located on the second seed layer. The purpose of the first, second and third seed layers 246, 248 and 250 will be described in more detail hereinafter.

The free layer 202 has a magnetic moment 252 which is parallel to the ABS in a direction from right to left or from left to right, as shown in FIG. 12. When a field signal from a rotating magnetic disk, such as magnetic disk 34 in FIG. 1, rotates the magnetic moment 252 upwardly into the sensor the magnetic moment 252 becomes more parallel with respect to the magnetic moments 228 and 234 which increases the resistance of the sensor to the sense current Is and when a signal field rotates the magnetic moment 252 downwardly out of the sensor the magnetic moment 252 becomes more antiparallel with respect to the magnetic moments 228 and 234 which increases the resistance of the spin valve sensor to the sense current $I_S$. These increases and decreases in resistance are processed as playback signals by the processing circuitry 50 in FIG. 3.

Exemplary thicknesses of materials for the layers not already discussed are 150 Å of platinum manganese (PtMn) for the first pinning layer 224, 17 Å of cobalt iron (CoFe) for the first AP pinned layer 214, 8 Å of ruthenium (Ru) for the first antiparallel coupling layer 212, 20 Å of cobalt iron (CoFe) for the second AP pinned layer 216, 21 Å of copper (Cu) for the first spacer layer 204, 10 Å of cobalt iron (CoFe) for the second free film 242, 10 Å of nickel iron (NiFe) for the first free film 240, 10 Å of cobalt iron (CoFe) for the third free film 244, 21 Å of copper (Cu) for the second spacer layer 206, 17 Å of cobalt iron (CoFe) for the fourth AP pinned layer 222, 8 Å of ruthenium (Ru) for the second antiparallel coupling layer 218, 20 Å of cobalt iron (CoFe) for the third AP pinned layer 220, 150 Å of platinum manganese (PtMn) for the second pinning layer 230 and 30 Å of tantalum (Ta) for the cap layer 232.

It should be noted that the second AP pinned layer 216 is thicker than the first AP pinned layer 214 and that the third AP pinned layer 220 is thicker than the fourth AP pinned layer 222. With this arrangement a current pulse through the sense current circuit of approximately three times the sense current (3×0.30 volts=0.90 volts) directed in the same direction as the sense current $I_S$ will cause the magnetic moment 228 of the second AP pinned layer 216 to be directed into the sensor and the magnetic moment 232 of the third AP pinned layer 220 to be directed out of the sensor. By the strong antiparallel coupling between the second and first AP pinned layers 216 and 214 the magnetic moment 226 will also be directed out of the paper so that the magnetic spins of the first and second pinning layers 224 and 230 are oriented in the same direction as the magnetic moments 226 and 232. The current pulse is sufficient to raise the temperature of the first and second pinning layers 224 and 230 so as to permit the desired orientation of their magnetic spins. When the current pulse is terminated the first and second pinning layers cool and the magnetic spins are set in place for pinning the magnetic moments 226 and 232 perpendicular to the ABS and out of the sensor, as shown in FIG. 12. This causes the magnetic moments 228 and 234 to be perpendicular to the ABS and directed into the sensor, as shown in FIG. 12, so that they are in-phase for combining the spin valve effect on each side of the free layer 202.

In a preferred embodiment the free layer 202 is symmetrical, as shown in FIG. 12. Further, the entirety of the conductive layers below the free layer 202 has an electrical conductivity which is equal to the entirety of the conductive layers above the free layer 202. With this arrangement sense current fields $H_I$ acting on the free layer 202 from the layers below free layer will completely counterbalance sense current fields $H_I$ from the conductive layers above the free layer. This may be accomplished by making the first and second spacer layers 204 and 206 equally conductive, making the second and third AP pinned layers 216 and 220 equally conductive, making the first and fourth AP pinned layers 214 and 222 equally conductive and making the first and second pinning layers 224 and 230 equally conductive. The complete counterbalancing of the sense current fields on each side of the free layer 202 is shown by the sense current fields $H_I$ which are antiparallel with respect to one another in FIG. 13.

Figure 13:
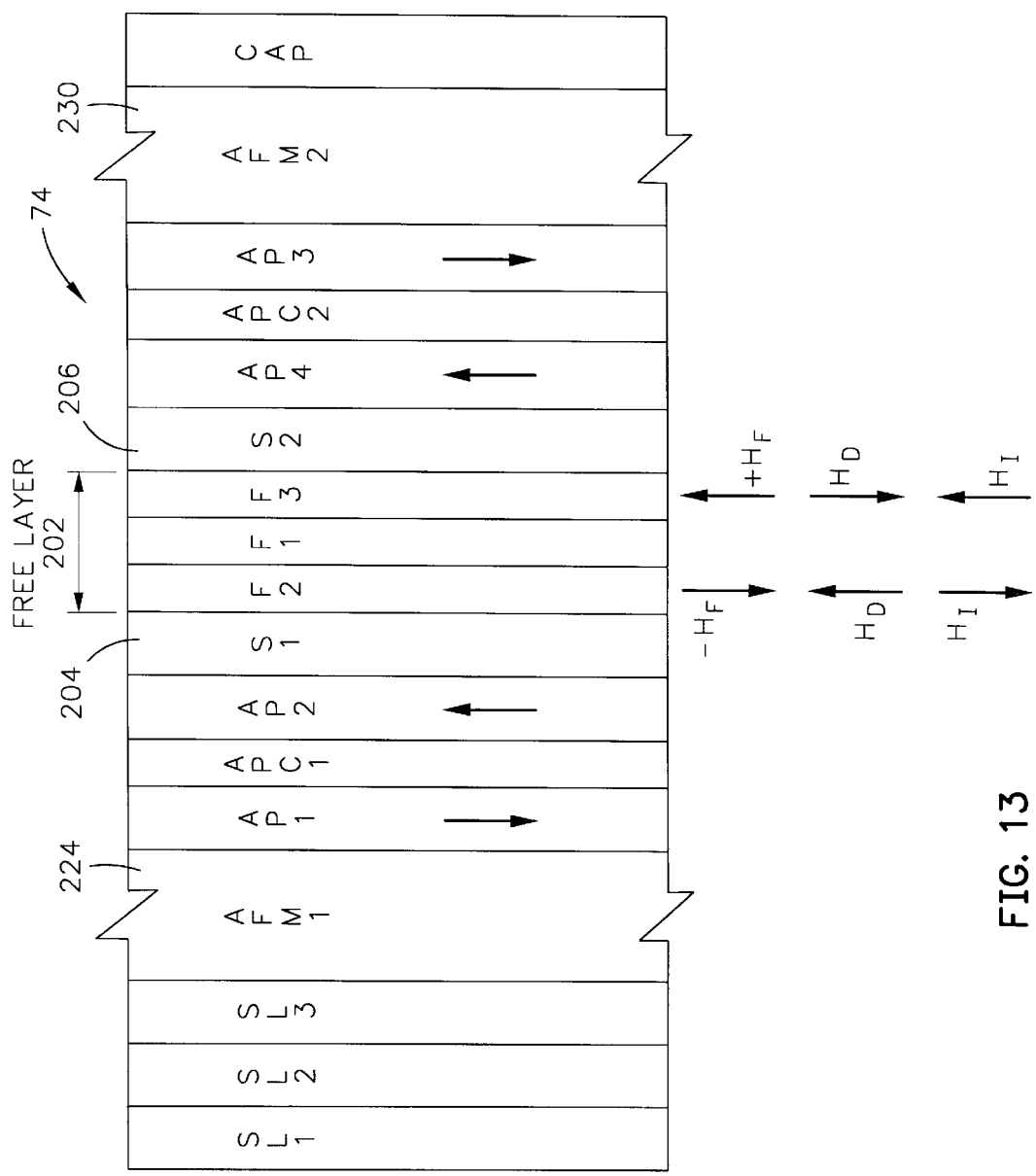
FIG. 13 is a view from the left end of FIG. 12 rotated 90° clockwise.

Further, by making the second and third pinned layers 216 and 220 with equal magnetic thicknesses and the first and fourth AP pinned layers 214 and 222 with equal magnetic thicknesses the first and second AP pinned layer structures 208 and 210 exert demagnetizing fields $H_D$ which are antiparallel and completely counterbalance each other, as shown in FIG. 13.

Figure 14:
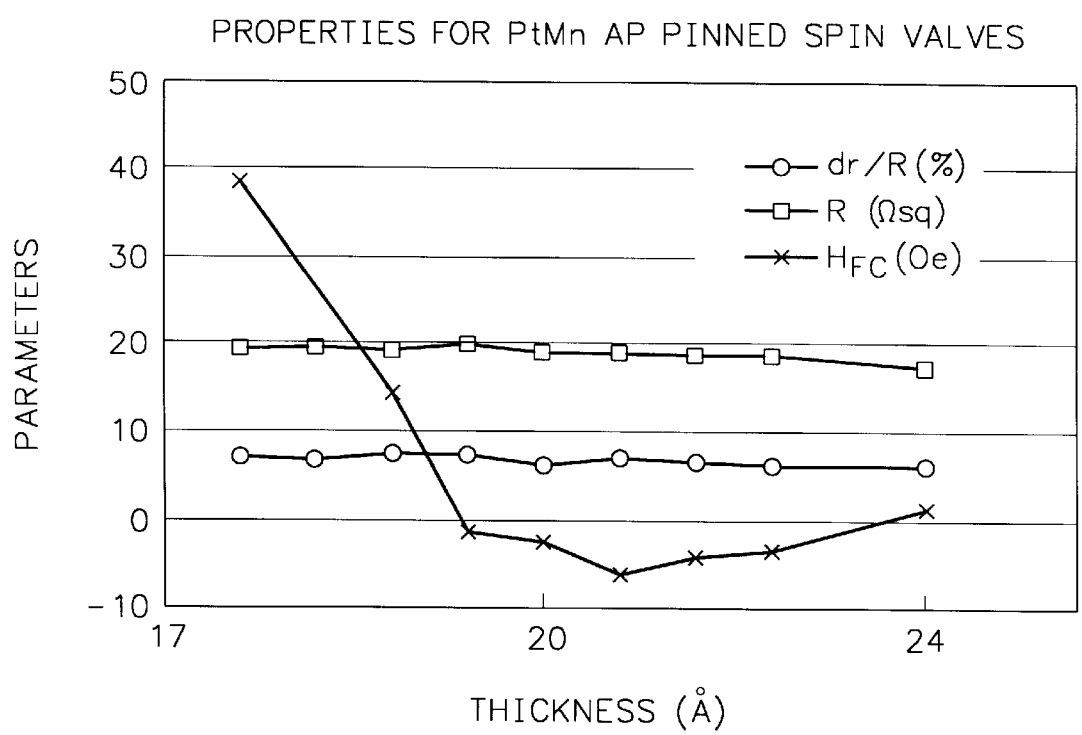
FIG. 14 is a graph of various parameters versus thicknesses of a copper (Cu) spacer layer for an AP pinned layer spin valve sensor.

FIG. 14 shows various parameters for platinum manganese (PtMn) AP pinned spin valves for various thicknesses of a copper (Cu) spacer layer. The various parameters are magnetoresistive coefficient (dr/R), the resistance of the sensor R and the ferromagnetic coupling field $H_{FC}$. It can be seen from the graph that the ferromagnetic coupling field $H_{FC}$ is negative when the thickness of the spacer layer is in a range from about 19.5 Å to 24 Å. Accordingly, when the spacer layer 204 in FIG. 12 is 21 Å of copper (Cu) the ferromagnetic coupling field $H_{FC}$ is approximately −6 Oe. This ferromagnetic coupling field is caused by the second AP pinned layer 216 which interfaces the first spacer layer 204. The fourth AP pinned layer 222, which interfaces the second spacer layer 206, will exert a positive ferromagnetic coupling field $H_{FC}$ of approximately +6 Oe which will counterbalance the negative ferromagnetic coupling field, as shown in FIG. 13, when the spacer layer 206 is 19 Å.

Discussion

It should be noted that the sensor in FIG. 12 is insensitive to the direction of the sense current $I_S$. If the sense current Is in FIG. 12 is reversed so that it is directed from right to left instead of from left to right, the magnetic moments 226, 228, 234 and 232 are simply reversed in their directions without any change in the functioning of the spin valve sensor. Further, it should be noted that the thicknesses of the first and fourth AP pinned layers 214 and 222 could be made greater than the thicknesses of the second and third AP pinned layers 216 and 220 without changing the operation of the spin valve sensor. For instance, the first and fourth AP pinned layers may be 20 Å of cobalt iron (CoFe) and the second and third AP pinned layers 216 and 220 may be 17 Å of cobalt iron (CoFe). It should further be understood that cobalt (Co) may be used in place of cobalt iron (CoFe). Still further, the second pinning layer 230 may be a material other than platinum manganese, such as nickel manganese or iridium manganese. However, it is preferable that the second pinning layer 230 have the same electrical conductivity as the first pinning layer 224.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head having an air bearing surface (ABS) comprising:
   a spin valve sensor including:
   a ferromagnetic free layer,
   first and second antiparallel (AP) pinned layer structures;
   a nonmagnetic conductive first spacer layer between the free layer and the first AP pinned layer structure and a nonmagnetic conductive second spacer layer between the free layer and the second AP pinned layer structure;
   an antiferromagnetic first pinning layer exchange coupled to the first AP pinned layer structure for pinning a net magnetic moment of the first AP pinned layer structure in a first direction;
   an antiferromagnetic second pinning layer exchange coupled to the second AP pinned layer structure for pinning a net magnetic moment of the second AP pinned layer structure in a second direction;
   the first AP pinned layer structure consisting of only a first antiparallel (AP) coupling layer and ferromagnetic first and second AP pinned layers with the AP coupling layer located between the ferromagnetic first and second AP pinned layers;
   the second AP pinned layer structure consisting of only a second antiparallel (AP) coupling layer and ferromagnetic third and fourth AP pinned layers with the second AP coupling layer located between the ferromagnetic third and fourth AP pinned layers;
   the first AP pinned layer interfacing the first pinning layer and the third AP pinned layer interfacing the second pinning layer;
   the second AP pinned layer interfacing the first spacer layer and the fourth AP pinned layer interfacing the second spacer layer; and
   the first, second, third and fourth AP pinned layers of the first and second AP pinned layer structures having thicknesses which urge the net magnetic moment of the first AP pinned layer structure in said first direction, urge the net magnetic moment of the second AP pinned layer structure in said second direction and orient the magnetic moments of the second and fourth AP pinned layers parallel with respect to one another when a current pulse is conducted through the spin valve sensor in a direction parallel to said ABS and parallel to major planes of the layers of the spin valve sensor and then not conducted through the spin valve sensor.

2. A magnetic read head as claimed in claim 1 including:
   nonmagnetic insulative first and second read gap layers;
   the spin valve sensor being located between the first and second read gap layers;
   ferromagnetic first and second shield layers; and
   the first and second read gap layers being located between the first and second shield layers.

3. A magnetic read head as claimed in claim 2 wherein the first and second AP pinned layer structures exert first and second demagnetizing fields respectively on the free layer which totally counterbalance each other, said layers on first and second sides of the free layer exert first and second sense current fields respectively on the free layer which totally counterbalance each other when a sense current field is conducted through the sensor and the first and second AP pinned layer structures exert first and second ferromagnetic coupling fields respectively on the free layer which totally counterbalance each other.

4. A magnetic read head as claimed in claim 2 including:
   a first seed layer composed of aluminum oxide ($Al_2O_3$), a second seed layer composed of nickel manganese oxide (NiMnO) directly on the first seed layer and a third seed layer composed of tantalum (Ta) directly on the second seed layer;
   the first pinning layer being composed of platinum manganese (PtMn) and located directly on the third seed layer; and
   the first spacer having a thickness which causes the first AP pinned layer structure to exert a negative ferromagnetic coupling field on the free layer.

5. A magnetic read head as claimed in claim 2 including:
   the first and fourth AP pinned layers having equal magnetic thicknesses and the second and third AP pinned layers having equal magnetic thicknesses with the magnetic thicknesses of the second and third AP pinned layers being greater than or less than the magnetic thicknesses of the first and fourth AP pinned layers.

6. A magnetic read head as claimed in claim 5 wherein the first and second AP pinned layer structures exert first and second demagnetizing fields respectively on the free layer which totally counterbalance each other, said layers on first and second sides of the free layer exert first and second sense current fields respectively on the free layer which totally counterbalance each other when a sense current field is conducted through the sensor and the first and second AP pinned layer structures exert first and second ferromagnetic coupling fields respectively on the free layer which totally counterbalance each other.

7. A magnetic read head as claimed in claim 6 including:
   a first seed layer composed of aluminum oxide ($Al_2O_3$), a second seed layer composed of nickel manganese oxide (NiMnO) directly on the first seed layer and a third seed layer composed of tantalum (Ta) directly on the second seed layer;
   the first pinning layer being composed of platinum manganese (PtMn) and located directly on the third seed layer; and
   the first spacer having a thickness which causes the first AP pinned layer structure to exert a negative ferromagnetic coupling field on the free layer.

8. A magnetic read head as claimed in claim 7 wherein the first and second spacer layers are equally conductive.

9. A magnetic read head as claimed in claim 8 wherein the free layer includes a first free film composed of nickel iron (NiFe) located between second and third free films composed of cobalt iron (CoFe).

10. A magnetic head assembly, having an air bearing surface (ABS), comprising:
    a write head including:
    ferromagnetic first and second pole piece layers that have a yoke portion located between a pole tip portion and a back gap portion;
    a nonmagnetic write gap layer located between the pole tip portions of the first and second pole piece layers;

an insulation stack with at least one coil layer embedded therein located between the yoke portions of the first and second pole piece layers; and
the first and second pole piece layers being connected at their back gap portions;
a read head including:
a spin valve sensor,
nonmagnetic insulative first and second read gap layers;
the spin valve sensor being located between the first and second read gap layers,
a ferromagnetic first shield layer; and
the first and second read gap layers being located between the first shield layer and
the first pole piece layer;
the spin valve sensor including:
a ferromagnetic free layer;
first and second antiparallel (AP) pinned layer structures;
a nonmagnetic conductive first spacer layer between the free layer and the first AP pinned layer structure and a nonmagnetic conductive second spacer layer between the free layer and the second AP pinned layer structure;
an antiferromagnetic first pinning layer exchange coupled to the first AP pinned layer structure for pinning a net magnetic moment of the first AP pinned layer structure in a first direction;
an antiferromagnetic second pinning layer exchange coupled to the second AP pinned layer structure for pinning a net magnetic moment of the second AP pinned layer structure in a second direction;
the first AP pinned layer structure consisting of only a first antiparallel (AP) coupling layer and ferromagnetic first and second AP pinned layers with the AP coupling layer located between the ferromagnetic first and second AP pinned layers;
the second AP pinned layer structure consisting of only a second antiparallel (AP) coupling layer and ferromagnetic third and fourth AP pinned layers with the second AP coupling layer located between the ferromagnetic third and fourth AP pinned layers;
the first AP pinned layer interfacing the first pinning layer and the third AP pinned layer interfacing the second pinning layer;
the second AP pinned layer interfacing the first spacer layer and the fourth AP pinned layer interfacing the second spacer layer; and
the first, second, third and fourth AP pinned layers of the first and second AP pinned layer structures having thicknesses which urge the net magnetic moment of the first AP pinned layer structure in said first direction, urge the net magnetic moment of the second AP pinned layer structure in said second direction and orient the magnetic moments of the second and fourth AP pinned layers parallel with respect to one another when a current pulse is conducted through the spin valve sensor in a direction parallel to said ABS and parallel to major planes of the layers of the spin valve sensor and then not conducted through the spin valve sensor.

11. A magnetic head assembly as claimed in claim 10 including:
a second shield layer;
the first and second read gap layers being located between the first and second shield layers; and
a nonmagnetic insulative isolation layer located between the second shield layer and the first pole piece layer.

12. A magnetic head assembly as claimed in claim 10 including:
the first and fourth AP pinned layers having equal magnetic thicknesses and the second and third AP pinned layers having equal magnetic thicknesses with the magnetic thicknesses of the second and third AP pinned layers being greater than or less than the magnetic thicknesses of the first and fourth AP pinned layers.

13. A magnetic head assembly as claimed in claim 12 wherein the first and second AP pinned layer structures exert first and second demagnetizing fields respectively on the free layer which totally counterbalance each other, said layers on first and second sides of the free layer exert first and second sense current fields respectively on the free layer which totally counterbalance each other when a sense current field is conducted through the sensor and the first and second AP pinned layer structures exert first and second ferromagnetic coupling fields respectively on the free layer which totally counterbalance each other.

14. A magnetic head assembly as claimed in claim 13 including:
a first seed layer composed of aluminum oxide ($Al_2O_3$),
a second seed layer composed of nickel manganese oxide (NiMnO) directly on the first seed layer and a third seed layer composed of tantalum (Ta) directly on the second seed layer;
the first pinning layer being composed of platinum manganese (PtMn) and located directly on the third seed layer; and
the first spacer having a thickness which causes the first AP pinned layer structure to exert a negative ferromagnetic coupling field on the free layer.

15. A magnetic head assembly as claimed in claim 14 wherein the first and second spacer layers are equally conductive.

16. A magnetic head assembly as claimed in claim 15 wherein the free layer includes a first free film composed of nickel iron (NiFe) located between second and third free films composed of cobalt iron (CoFe).

17. A magnetic disk drive comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a spin valve sensor:
nonmagnetic insulative first and second read gap layers;
the spin valve sensor being located between the first and second read gap layers;
a ferromagnetic first shield layer; and
the first and second read gap layers being located between the first shield layer and the first pole piece layer;
the spin valve sensor including:
a ferromagnetic free layer;
first and second antiparallel (AP) pinned layer structures;
a nonmagnetic conductive first spacer layer between the free layer and the first AP pinned layer structure and a nonmagnetic conductive second spacer layer between the free layer and the second AP pinned layer structure;

an antiferromagnetic first pinning layer exchange coupled to the first AP pinned layer structure for pinning a net magnetic moment of the first AP pinned layer structure in a first direction;

an antiferromagnetic second pinning layer exchange coupled to the second AP pinned layer structure for pinning a net magnetic moment of the second AP pinned layer structure in a second direction;

the first AP pinned layer structure consisting of only a first antiparallel (AP) coupling layer and ferromagnetic first and second AP pinned layers with the AP coupling layer located between the ferromagnetic first and second AP pinned layers;

the second AP pinned layer structure consisting of only a second antiparallel (AP) coupling layer and ferromagnetic third and fourth AP pinned layers with the second AP coupling layer located between the ferromagnetic third and fourth AP pinned layers;

the first AP pinned layer interfacing the first pinning layer and the third AP pinned layer interfacing the second pinning layer;

the second AP pinned layer interfacing the first spacer layer and the fourth AP pinned layer interfacing the second spacer layer; and the first, second, third and fourth AP pinned layers of the first and second AP pinned layer structures having thicknesses which urge the net magnetic moment of the first AP pinned layer structure in said first direction, urge the net magnetic moment of the second AP pinned layer structure in said second direction and orient the magnetic moments of the second and fourth AP pinned layers parallel with respect to one another when a current pulse is conducted through the spin valve sensor in a direction parallel to said ABS and parallel to major planes of the layers of the spin valve sensor and then not conducted through the spin valve sensor; and a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

18. A magnetic disk drive as claimed in claim 17 including:

a second shield layer;

the first and second read gap layers being located between the first and second shield layers; and a nonmagnetic insulative isolation layer located between the second shield layer and the first pole piece layer.

19. A magnetic disk drive as claimed in claim 17 including:

the first and fourth AP pinned layers having equal magnetic thicknesses and the second and third AP pinned layers having equal magnetic thicknesses with the magnetic thicknesses of the second and third AP pinned layers being greater than or less than the magnetic thicknesses of the first and fourth AP pinned layers.

20. A magnetic disk drive as claimed in claim 19 wherein the first and second AP pinned layer structures exert first and second demagnetizing fields respectively on the free layer which totally counterbalance each other, said layers on first and second sides of the free layer exert first and second sense current fields respectively on the free layer which totally counterbalance each other when a sense current field is conducted through the sensor and the first and second AP pinned layer structures exert first and second ferromagnetic coupling fields respectively on the free layer which totally counterbalance each other.

21. A magnetic disk drive as claimed in claim 20 including:

a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;

the first pinning layer being composed of platinum manganese (PtMn) and located directly on the third seed layer; and the first spacer having a thickness which causes the first AP pinned layer structure to exert a negative ferromagnetic coupling field on the free layer.

22. A magnetic disk drive as claimed in claim 21 wherein the first and second spacer layers are equally conductive.

23. A magnetic disk drive as claimed in claim 22 wherein the free layer includes a first free film composed of nickel iron (NiFe) located between second and third free films composed of cobalt iron (CoFe).

24. A method of making a magnetic read head comprising:

making a spin valve sensor comprising the steps of:

forming a ferromagnetic free layer;

forming first and second antiparallel (AP) pinned layer structures, forming a nonmagnetic conductive first spacer layer between the free layer and the first AP pinned layer structure and a nonmagnetic conductive second spacer layer between the free layer and the second AP pinned layer structure;

forming an antiferromagnetic first pinning layer exchange coupled to the first AP pinned layer structure for pinning a net magnetic moment of the first AP pinned layer structure in a first direction;

forming an antiferromagnetic second pinning layer exchange coupled to the second AP pinned layer structure for pinning a net magnetic moment of the second AP pinned layer structure in a second direction;

forming the first AP pinned layer structure consisting of only a first antiparallel (AP) coupling layer and ferromagnetic first and second AP pinned layers with the AP coupling layer located between the ferromagnetic first and second AP pinned layers;

forming the second AP pinned layer structure consisting of only a second antiparallel (AP) coupling layer and ferromagnetic third and fourth AP pinned layers with the second AP coupling layer located between the ferromagnetic third and fourth AP pinned layers;

forming the first AP pinned layer interfacing the first pinning layer and the third AP pinned layer interfacing the second pinning layer;

forming the second AP pinned layer interfacing the first spacer layer and the fourth AP pinned layer interfacing the second spacer layer; and forming the first, second, third and fourth AP pinned layers of the first and second AP pinned layer structures with thicknesses which urge the net magnetic moment of the first AP pinned layer structure in said first direction, urge the net magnetic moment of the second AP pinned layer structure in said second direction and orient the magnetic moments of the second and fourth AP pinned layers parallel with respect to one another when a current pulse is conducted through the spin valve sensor in a direction parallel to said ABS and parallel to major planes of the layers of the spin valve sensor and then not conducted through the spin valve sensor.

25. A method of making a magnetic read head as claimed in claim 24 including the steps of:

forming nonmagnetic insulative first and second read gap layers with the spin valve sensor being formed between the first and second read gap layers; and forming ferromagnetic first and second shield layers with the first and second read gap layers being formed between the first and second shield layers.

26. A method of making a magnetic read head as claimed in claim 25 wherein forming the first and second AP pinned layer structures are formed so that they exert first and second demagnetizing fields respectively on the free layer which totally counterbalance each other, the layers on first and second sides of the free layer are formed so that they exert first and second sense current fields respectively on the free layer which totally counterbalance each other when a sense current field is conducted through the sensor and the first and second AP pinned layer structures are formed so that they exert first and second ferromagnetic coupling fields respectively on the free layer which totally counterbalance each other.

27. A method of making a magnetic read head as claimed in claim 25 including the steps of:

forming a first seed layer composed of aluminum oxide ($Al_2O_3$), forming a second seed layer composed of nickel manganese oxide (NiMnO) directly on the first seed layer and forming a third seed layer composed of tantalum (Ta) directly on the second seed layer;

forming the first pinning layer of platinum manganese (PtMn) and locating it directly on the third seed layer; and forming the first spacer with a thickness which causes the first AP pinned layer structure to exert a negative ferromagnetic coupling field on the free layer.

28. A method of making a magnetic read head as claimed in claim 25 including the step of:

forming the first and fourth AP pinned layers with equal magnetic thicknesses and forming the second and third AP pinned layers with equal magnetic thicknesses with the magnetic thicknesses of the second and third AP pinned layers being greater than or less than the magnetic thicknesses of the first and fourth AP pinned layers.

29. A method of making a magnetic read head as claimed in claim 28 wherein forming the first and second AP pinned layer structures are formed so that they exert first and second demagnetizing fields respectively on the free layer which totally counterbalance each other, the layers on first and second sides of the free layer are formed so that they exert first and second sense current fields respectively on the free layer which totally counterbalance each other when a sense current field is conducted through the sensor and the first and second AP pinned layer structures are formed so that they exert first and second ferromagnetic coupling fields respectively on the free layer which totally counterbalance each other.

30. A method of making a magnetic read head as claimed in claim 29 including the steps of:

forming a first seed layer composed of aluminum oxide ($Al_2O_3$), forming a second seed layer composed of nickel manganese oxide (NiMnO) directly on the first seed layer and forming a third seed layer composed of tantalum (Ta) directly on the second seed layer;

forming the first pinning layer of platinum manganese (PtMn) and locating it directly on the third seed layer; and forming the first spacer with a thickness which causes the first AP pinned layer structure to exert a negative ferromagnetic coupling field on the free layer.

31. A method of making a magnetic read head as claimed in claim 30 including the step of forming the first and second spacer layers so that they are equally conductive.

32. A method of making a magnetic read head as claimed in claim 31 wherein the free layer is formed by forming a first free film composed of nickel iron (NiFe) and forming second and third free films composed of cobalt iron (CoFe) with the first free film located between the second and third free films.

33. A method of making a magnetic head assembly, which has an air bearing surface (ABS), comprising the steps of:

making a write head comprising the steps of:

forming ferromagnetic first and second pole piece layers in pole tip, yoke and back regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and second pole piece layers at said back gap region;

making a read head comprising the steps of:

forming a spin valve sensor and nonmagnetic insulative first and second read gap layers with the spin valve sensor located between the first and second read gap layers; and forming a ferromagnetic first shield layer with the first and second read gap layers located between the first shield layer and the first pole piece layer;

making the spin valve sensor comprising the steps of:

forming a ferromagnetic free layer;

forming first and second antiparallel (AP) pinned layer structures;

forming a nonmagnetic conductive first spacer layer between the free layer and the first AP pinned layer structure and a nonmagnetic conductive second spacer layer between the free layer and the second AP pinned layer structure;

forming an antiferromagnetic first pinning layer exchange coupled to the first AP pinned layer structure for pinning a net magnetic moment of the first AP pinned layer structure in a first direction;

forming an antiferromagnetic second pinning layer exchange coupled to the second AP pinned layer structure for pinning a net magnetic moment of the second AP pinned layer structure in a second direction;

forming the first AP pinned layer structure consisting of only a first antiparallel (AP) coupling layer and ferromagnetic first and second AP pinned layers with the AP coupling layer located between the ferromagnetic first and second AP pinned layers;

forming the second AP pinned layer structure consisting of only a second antiparallel (AP) coupling layer and ferromagnetic third and fourth AP pinned layers with the second AP coupling layer located between the ferromagnetic third and fourth AP pinned layers;

forming the first AP pinned layer interfacing the first pinning layer and the third AP pinned layer interfacing the second pinning layer;

forming the second AP pinned layer interfacing the first spacer layer and the fourth AP pinned layer interfacing the second spacer layer; and forming the first, second, third and fourth AP pinned layers of the first and second AP pinned layer structures with thicknesses which urge the net magnetic moment of the first AP pinned layer structure in said first direction, urge the net magnetic moment of the second AP pinned layer structure in said second direction and orient the magnetic moments of the second and fourth AP pinned layers parallel with respect to one another when a current pulse is conducted through the spin valve sensor in a direction parallel to said ABS and parallel to major planes of the layers of the spin valve sensor and then not conducted through the spin valve sensor.

34. A method of making a magnetic head assembly as claimed in claim 33 further comprising the steps of:

forming a second shield layer with the first and second read gap layers located between the first and second shield layers; and forming a nonmagnetic insulative isolation layer with the isolation layer located between the second shield layer and the first pole piece layer.

35. A method of making a magnetic head assembly as claimed in claim 33 including:

forming the first and fourth AP pinned layers with equal magnetic thicknesses and forming the second and third AP pinned layers with equal magnetic thicknesses with the magnetic thicknesses of the second and third AP pinned layers being greater than or less than the magnetic thicknesses of the first and fourth AP pinned layers.

36. A method of making a magnetic head assembly as claimed in claim 35 wherein forming the first and second AP pinned layer structures are formed so that they exert first and second demagnetizing fields respectively on the free layer which totally counterbalance each other, the layers on first and second sides of the free layer are formed so that they exert first and second sense current fields respectively on the free layer which totally counterbalance each other when a sense current field is conducted through the sensor and the first and second AP pinned layer structures are formed so that they exert first and second ferromagnetic coupling fields respectively on the free layer which totally counterbalance each other.

37. A method of making a magnetic head assembly as claimed in claim 36 including:

forming a first seed layer composed of aluminum oxide ($Al_2O_3$), forming a second seed layer composed of nickel manganese oxide (NiMnO) directly on the first seed layer and forming a third seed layer composed of tantalum (Ta) directly on the second seed layer;

forming the first pinning layer of platinum manganese (PtMn) and locating it directly on the third seed layer; and forming the first spacer with a thickness which causes the first AP pinned layer structure to exert a negative ferromagnetic coupling field on the free layer.

38. A method of making a magnetic head assembly as claimed in claim 37 including forming the first and second spacer layers so that they are equally conductive.

39. A method of making a magnetic head assembly as claimed in claim 38 wherein the free layer is formed by forming a first free film composed of nickel iron (NiFe) and forming second and third free films composed of cobalt iron (CoFe) with the first free film located between the second and third free films.

* * * * *